United States Patent
Doglioni Majer

(10) Patent No.: US 9,518,760 B2
(45) Date of Patent: Dec. 13, 2016

(54) METHOD FOR TREATING LIMESCALE DEPOSITS WITHIN WATER HEATERS INSIDE BEVERAGE DISPENSING MACHINES

(75) Inventor: Luca Doglioni Majer, Carate Urio (IT)

(73) Assignee: RHEAVENDORS SERVICES S.P.A., Como (IT)

( * ) Notice: Subject to any disclaimer, the term of this patent is extended or adjusted under 35 U.S.C. 154(b) by 1088 days.

(21) Appl. No.: 12/095,607

(22) PCT Filed: Dec. 20, 2006

(86) PCT No.: PCT/IB2006/003699
§ 371 (c)(1),
(2), (4) Date: Jul. 8, 2008

(87) PCT Pub. No.: WO2007/072181
PCT Pub. Date: Jun. 28, 2007

(65) Prior Publication Data
US 2010/0154819 A1    Jun. 24, 2010

(30) Foreign Application Priority Data
Dec. 23, 2005  (EP) ................. 05028307

(51) Int. Cl.
| | | |
|---|---|---|
| *B08B 3/12* | (2006.01) | |
| *F24H 9/00* | (2006.01) | |
| *A47J 31/60* | (2006.01) | |
| *C02F 1/36* | (2006.01) | |
| *C02F 5/02* | (2006.01) | |

(52) U.S. Cl.
CPC ............. *F24H 9/0042* (2013.01); *A47J 31/60* (2013.01); *B08B 3/12* (2013.01); *C02F 1/36* (2013.01); *C02F 5/025* (2013.01); *C02F 2209/006* (2013.01)

(58) Field of Classification Search
CPC ................................. B08B 3/12; A47J 31/60
USPC .................... 134/1, 58, 35, 104.4 R
See application file for complete search history.

(56) References Cited

U.S. PATENT DOCUMENTS

| | | | | |
|---|---|---|---|---|
| 3,666,558 | A * | 5/1972 | Pryor ................. | 134/1 |
| 4,120,699 | A * | 10/1978 | Kennedy et al. .......... | 134/1 |
| 5,462,604 | A * | 10/1995 | Shibano ............... | B06B 1/0284 134/1 |
| 6,538,360 | B2 * | 3/2003 | Puskas ................ | 310/316.01 |
| 2003/0102007 | A1 * | 6/2003 | Kaiser ................ | 134/1 |
| 2003/0221564 | A1 * | 12/2003 | Meineke et al. .......... | 99/279 |

FOREIGN PATENT DOCUMENTS

| | | | |
|---|---|---|---|
| DE | 29 19 10 A1 | 11/1980 | |
| DE | 2919110 | * 11/1980 | |
| DE | 102 45 824 B3 | 2/2004 | |
| GB | 2 227 254 A | 7/1990 | |
| GB | 2227254 A * | 7/1990 | .............. F22B 37/00 |

* cited by examiner

*Primary Examiner* — Michael Kornakov
*Assistant Examiner* — Katelyn Whatley
(74) *Attorney, Agent, or Firm* — Hess Patent Law Firm; Robert J. Hess

(57) ABSTRACT

A method and an apparatus for detaching limescale deposits within a water heater of a beverage dispensing machine, by powering an ultrasonic generator discontinuously to scan frequencies within a range of 20 kHz to 100 kHz so as to induce ultrasonic vibrations. Advantageously the step of inducing ultrasonic vibrations is implemented discontinuously at high energy levels.

9 Claims, 6 Drawing Sheets

METHOD FOR TREATING LIMESCALE DEPOSITS WITHIN WATER HEATERS INSIDE BEVERAGE DISPENSING MACHINES

CROSS REFERENCE TO RELATED APPLICATIONS

This application is a 371 national stage entry of International PCT Application PCT/IB2006/003699, filed Dec. 20, 2006, and claims priority under 35 U.S.C. 119(b) to foreign document EP 05028307.6, filed Dec. 23, 2005.

BACKGROUND OF THE INVENTION

The present invention relates to a method and an apparatus for treating limescale deposits within water heaters in beverage dispensing machines.

Water heaters are known to be subject to limescale build-up on the surfaces which contact the water. In fact heating the water leads to the ionization of the dissolved salts, and these tend to deposit in a layer on the surface of the water heater. The limescale build-up causes formation of hard deposits which are difficult to remove and detrimental to the operation of the heater and the associated ducts. Such deposits reduce the efficiency of the thermal exchange between the hot surfaces of the heater and the water, thereby causing waste of energy. Moreover an excessive build-up of limescale may cause ducts to be obstructed.

Different apparatuses have been provided for reducing, by way of vibrations, the limescale build-up within water heaters, such as boilers, flash-heaters, etc.

EP-A-1378194, in the name of "Fianara International B.V.", discloses an apparatus for preventing the limescale deposits within the water heater of a beverage dispensing machine. The apparatus is provided with an ultrasound transmitter and an ultrasound receiver, such as piezo-electric transducers, directly or indirectly coupled to the water heater. The ultrasound transmitter is powered during all the operation time of the beverage dispensing machine to generate oscillations which are transmitted to the heater body and then picked up by the receiver. An amplifier amplifies the oscillations and, without altering the phase, feeds back the oscillations to the transmitter, through the heater body. In this way a feedback loop is provided which makes the water heater to oscillate at its natural frequency, thereby avoiding the limescale build-up over the heater surfaces. The apparatus provides low power of piezo-electric transducers, included in the range from 100 mW to 250 mW, for long time.

The apparatus according to EP-A-1378194 requires an amplifier to be provided with an ultrasound receiver and the related circuitry, this leading to a complicated assembly and high production and maintenance costs. Setting up the circuitry can be complicated. The amplifier and the circuitry need to be cooled, especially if located next to the water heater, this requiring a particular attention during installation of the apparatus.

Moreover if the piezo-electric transducers are made of a ceramic material, they must be thermally isolated from the water heater. In fact, when the temperature of the transducers exceeds the Curie temperature of the ceramic material, the transducers cease to operate. Thus an insulating material must be provided between each transducer and the water heater. Such insulating material should promote sound transmission in order to allow propagation of the oscillations.

GB-A-2227254, in the name of "Instants Limited", refers to a method and the related apparatus for removing, or preventing, the formation of limescale deposits within a water heater. Water is oscillated at high frequencies by inducing ultrasonic vibrations, for instance by way of a piezo-electric device, in the range of 20 kHz to 100 kHz. Vibrations, which are transmitted to the water heater, are generated continuously to avoid a limescale build-up or to remove the deposits. Known methods and apparatuses for removing or preventing limescale build-up within water heaters have several drawbacks.

Causing the water heater to vibrate at its natural frequency may easily occur in troublesome noise generation. Moreover the water heater must be expressly designed to sustain the mechanical stresses which are maximized, in that the oscillations are at the heater natural frequency. Heaters normally utilized within beverage dispensing machines have a simple design and are unexpensive. Weldings, fittings, couplings, etc., between heater parts may fail under uninterrupted vibrations. A design of the water heater which takes into account such risks easily leads to an increase of production costs.

Causing the water heater to continuously vibrate, for long time, at high frequencies may also result in mechanical failures. Moreover such a solution is power consuming.

SUMMARY OF THE INVENTION

It is an object of the present invention to overcome the drawbacks of known solutions by providing a method and an apparatus for removing the limescale deposits within the water heater of a beverage dispensing machine which is easy to implement, effective and power saving.

This and other objects are achieved by the method according to the present invention as set forth in claim 1.

Advantageously the method provides the step of discontinuously inducing high energy ultrasonic vibrations within the water heater to achieve detachment of limescale deposits from the heater surfaces. "Discontinuously" means at discrete time intervals, which are relatively short with respect to the time the machine is powered, and not continuously, as required by known solutions. The number of time intervals of activation is within the range of 1 to 10, depending on the duration of each time interval. The total time of activation preferably is within the range of 15 to 40 minutes and preferably not longer than 30 minutes. This allows for an evident power saving. Duration of the time intervals for inducing vibrations is within the range of 30 seconds to 30 minutes and can be empirically set to a proper value in order to effectively achieve removal, or desired substantial reduction, of limescale deposits within the water heater.

The applicant has found that effective treatment of limescale deposits within a 20 liters heater can be achieved by inducing high energy oscillations within the heater body for short time intervals, i.e. of less than 20 minutes, thereby reducing power consumption and noise generation with respect to prior art solutions.

Preferably, frequency of the oscillations is different from the natural frequency of the water heater, this minimizing the risks of submitting the same water heater to destructive mechanical stresses or generating noise.

The ultrasonic oscillations can be generated by powering at least one piezo-electric transducer directly or indirectly coupled to the heater. For instance the piezo-electric transducer can be attached to a wall of the water heater to directly transmit vibrations to its surfaces. Alternatively the transducer can be submersed in the water contained within the heater. By inducing vibrations of the water, also the heater body vibrates. Proper electrical insulation of the transducer must be provided to avoid current flow through the water.

The method according to the present invention is particularly suitable for treating limescale deposits within the water heater of beverage dispensing machines, for instance machines which deliver coffee, tea, cappuccino, chocolate or any hot drink.

The step of inducing ultrasonic vibrations is preferably carried out once a day, at the shut-down or at the start-up of the same machine, or more times per day. This can be accomplished simply by powering the piezo-electric transducer for a preset time interval, preferably when the machine is not operating or in stand-by.

Suitable frequencies for such application are included in the range from 20 kHz to 100 kHz, preferably in the range from 25 kHz to 35 kHz. By inducing vibrations at 30 kHz in a typical water heater of a beverage dispensing machine limescale deposits can be removed, or drastically reduced, in less than 30 minutes, normally in 15 minutes.

Duration of the time interval(s) for inducing vibrations within the water heater can be set to a total of 30 minutes per day. One or more cleaning steps can be accomplished by implementing the method of the invention to achieve the desired reduction of the limescale build-up, thereby maintaining the efficiency of the heater and the related beverage dispensing machine.

According to an embodiment of the invention, vibrations are induced by scanning the frequencies included within the range 20 kHz to 100 kHz. Scanning of the frequencies, i.e. inducing vibrations at different frequencies during operation of the piezo-electric transducer, may be carried out in several ways.

For instance the piezo-electric transducer may be powered to vibrate the water heater at a frequency which increases or decreases as an analog quantity in the aforesaid range. This can be achieved by powering the piezo-electric transducer at continuously increasing/decreasing voltages.

As alternative, the piezo-electric transducer may be powered to vibrate the water heater at frequencies which increase or decrease as a train of impulses, each impulse being at a given frequency. For instance the transducer is firstly powered at 20 kHz for five seconds, then at 30 kHz for the following five seconds, then at 40 kHz for the following ten seconds, etc. This can be achieved by powering the piezo-electric transducer at discontinuously increasing/decreasing voltages.

The present invention also relates to an apparatus for detaching, removing, or reducing, the limescale deposits within a water heater.

A suitable device for inducing ultrasonic vibrations may comprise one or more piezo-electric transducers. For a typical coffee machine water heater, a single ceramic piezo-electric transducer can be utilized in the shape of a disc having a diameter of about 40 mm and height of about 5 mm; in order to reach the required oscillations amplitude, i.e. to provide high energy oscillations, the transducer is powered with 100 to 200 Volts. The disc is attached to the lateral wall of the heater and is controlled to implement the aforesaid method.

In order to induce high energy oscillations within the heater body, the piezo-electric transducer power is about 2 Watts, i.e. at least 10 times higher than the power provided by the apparatuses according to prior art. Generally, the piezo-electric transducer power is included in the range from 100 mW to 5 W. According to the present invention, such high energy oscillations are induced for short time intervals, preferably when the beverage dispensing machine is in stand-by or non operative.

The method and the apparatus of the present invention can be advantageously applied to clean the mixing chambers normally provided within the beverage dispensing machines. Ingredients such as water and milk powder, water and cocoa powder, etc., are mixed by a mixer rotating in the chamber. Residues may build up on the surfaces which cause hygienical problems. Oscillations can be induced to the chamber instead of the heater, in order to detach such alimentary residues from the chamber surfaces and the mixer to provide an effective cleaning process.

BRIEF DESCRIPTION OF THE DRAWING

Further advantages and features of the present invention will become apparent from the following detailed description with reference to the drawings enclosed as a non-restrictive example, where.

DETAILED DESCRIPTION OF THE INVENTION

Figure 1:
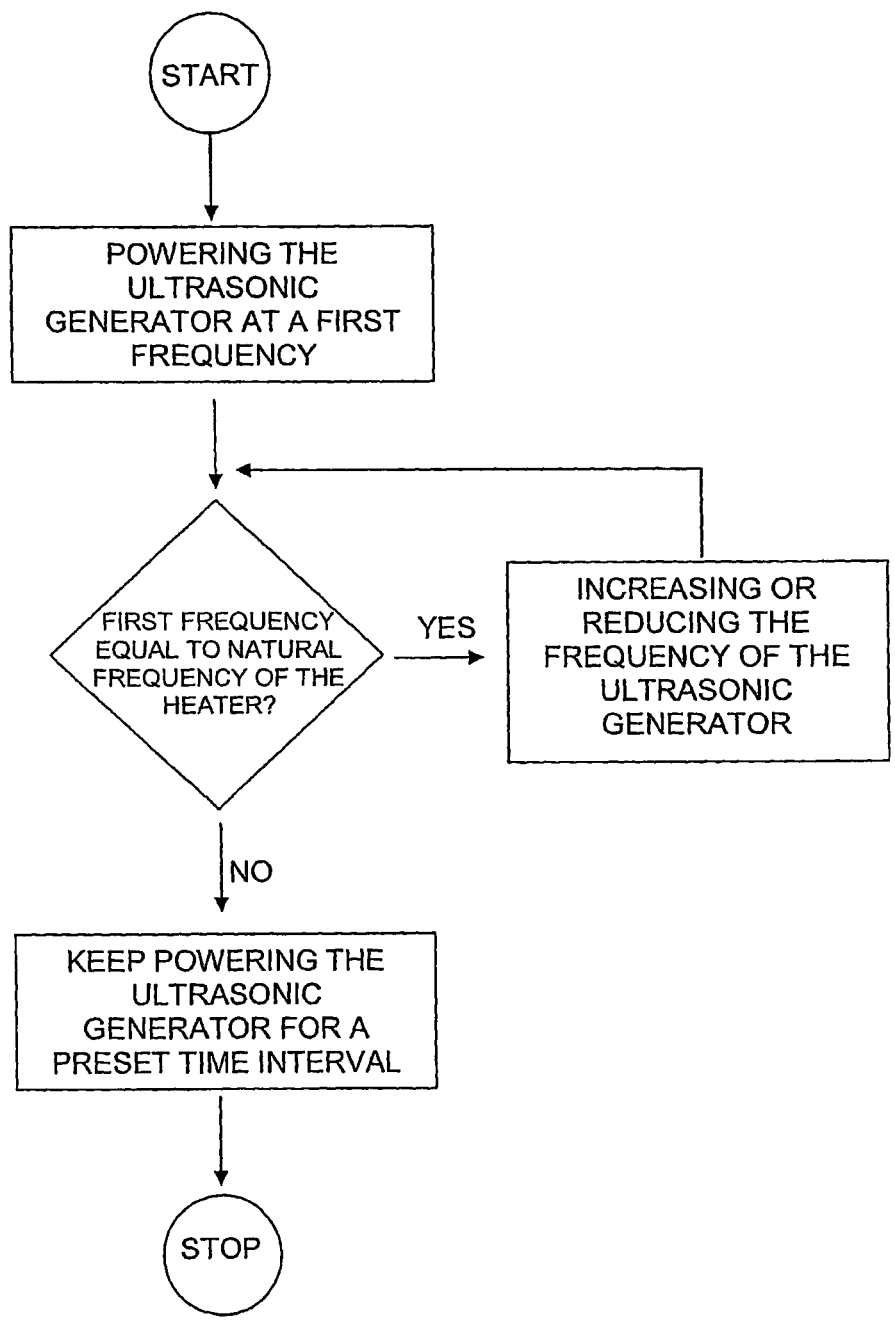
FIG. 1 is a first flow chart of a method according to the invention.

FIG. 1 shows a flow chart of the method according to the present invention for removing, or reducing, the limescale deposits within a water heater of a beverage dispensing machine. The method comprises the step of inducing high energy ultrasonic vibrations to the water heater by powering an ultrasonic generator directly or indirectly coupled to the same heater. For instance, the water heater supplies hot water to a beverage dispensing machine for preparing coffee, chocolate, cappuccino, tea, etc.

Differently from the method disclosed in prior art, in the present invention the ultrasonic vibrations are induced discontinuously, at short discrete time intervals. Preferably oscillations are at a frequency different from the natural frequency of the water heater. Resonance of the heater is avoided to prevent excessive mechanical stresses. In FIG. 1 the step of evaluating the natural frequency of the heater is optional.

Vibrations are induced discontinuously, i.e. at discrete time intervals, not continuously, to minimize energy consumption. For instance the ultrasonic generator can be powered once a day, during the start-up or the shut-down of the heater or the related machine, for a preset time interval. Alternatively, the ultrasonic generator can be powered at regular time intervals and for example for up to 30 minutes. In other words, the step of inducing ultrasonic vibrations to the water heater can be carried out once a day, more times per day, every hour, every 30 minutes, etc., independently upon water consumption or it can be carried out upon heating a preset volume of water, for instance every time 20 liters have been heated.

The natural frequency of the heater is known per se. For example producers of beverage dispensing machine can evaluate experimentally the value of the natural frequency, thereby setting a different frequency for the oscillations of the ultrasonic generator.

Alternatively, the method may comprise the step of sensing the amplitude of the heater oscillations when the ultrasonic generator is powered. If the value of such amplitude is close to the value of the amplitude of the oscillations at the natural frequency, or is considered to cause excessive stress of the heater weldings, couplings, etc., then the frequency of the induced vibrations is changed. By inducing vibrations at frequencies different from the natural frequency of the heater, mechanical stresses are minimized, as well as the noise produced by the vibrating surfaces of the heater 5.

Figure 2:
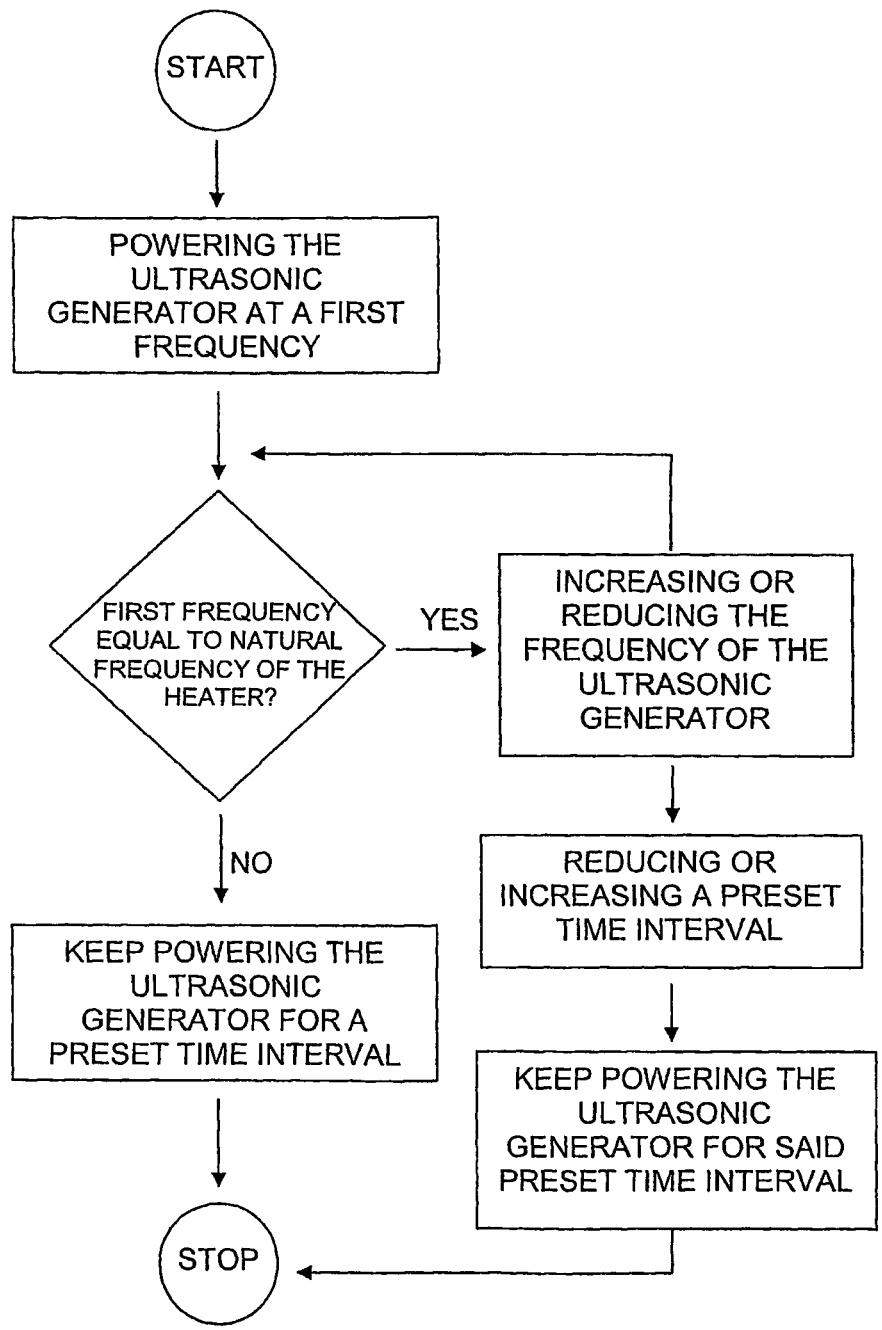
FIG. 2 is a second flow chart of a method according to the invention.

As shown in the flow chart of FIG. 2, when the frequency of the induced vibrations is changed, the duration of the time interval is changed correspondingly. As general principle, when the ultrasonic generator is powered at low frequencies, for instance in the range of 20 to 25 kHz, duration of each time interval for inducing vibrations is maximized, being for instance in the range from 20 to 30 minutes. When the ultrasonic generator is powered at high frequencies, for instance in the range from 35 to 100 kHz, duration of each time interval for inducing vibrations is minimized, being for instance in the range from 1 to 10 minutes. The same principle applies for what concerns the power, which is included in the range from 100 mW to 5 W. When the frequency of the induced vibrations is about the natural frequency of the heater, the power is controlled to be minimized.

The ultrasonic generator can be powered in such a way to scan all the frequencies included in the range 20 kHz to 100 kHz, as it will be explained later. Frequencies supplied to the ultrasonic generator affect frequencies of the oscillations induced within the water heater body. In other words, the frequency of the oscillations can change during the aforesaid time interval. If the natural frequency of the heater is included in the scanned range, such frequency is rapidly trespassed to avoid resonance, thereby minimizing noise produced by vibrating surfaces of the heater 5. The natural frequency data is obtained from the producer or by tests.

The method of the present invention can be advantageously applied to machines for preparing and dispensing hot beverages, such as coffee, chocolate, tea, cappuccino, etc. Substantially removing, or reducing, limescale deposits from the water heater of such machines allows for keeping the efficiency of the thermal exchange, with evident advantages for what concerns the operation of the machines and the power saving.

Figure 3:
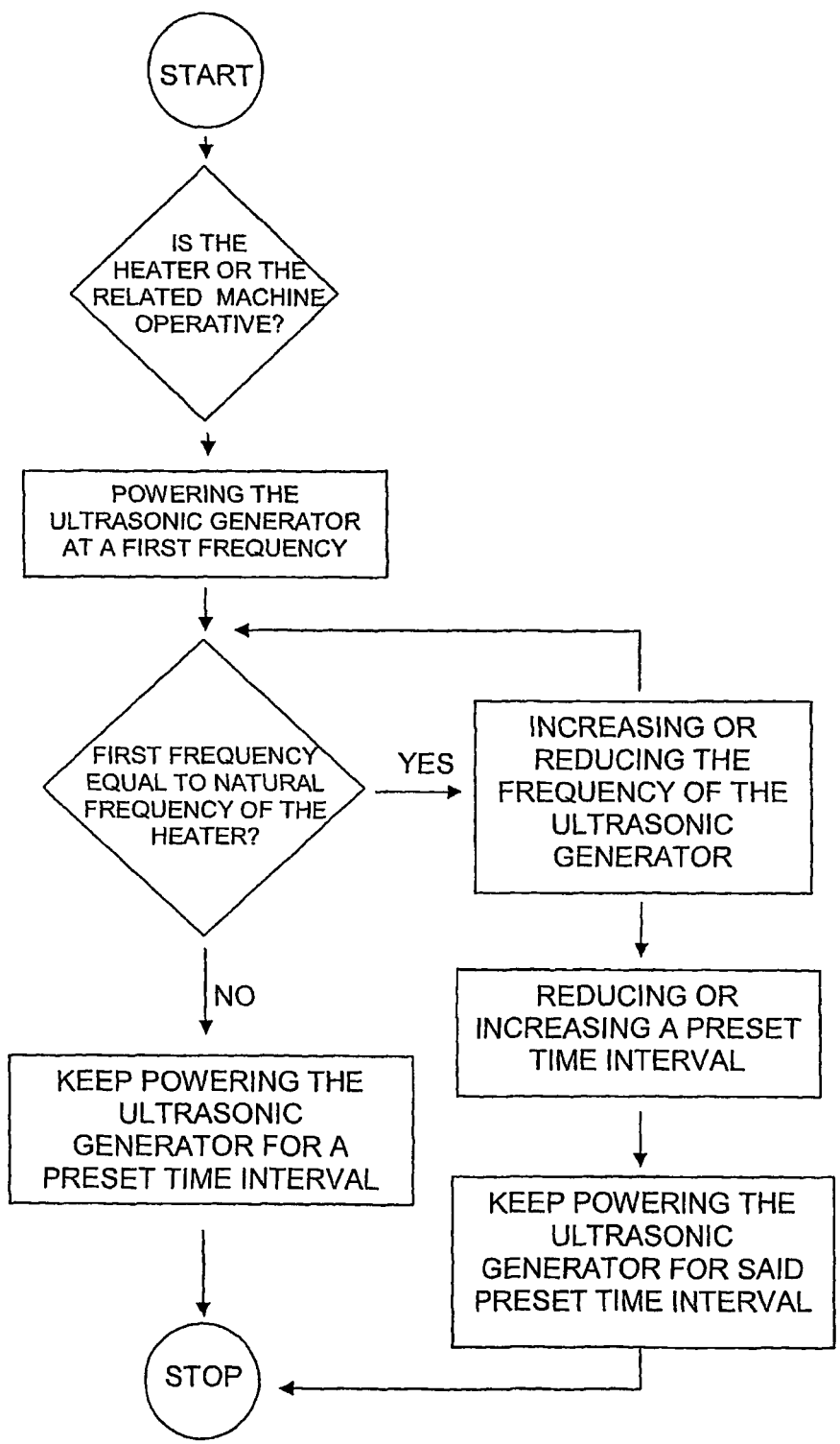
FIG. 3 is a third flow chart of a method according to the invention.

The method of the present invention, as shown in the flow chart of FIG. 3, is preferably carried out when the water heater is not warming water, or the related beverage dispensing machine is not dispensing a drink. In other words, when the machine is not dispensing a beverage, being for instance in stand-by, or the water heater is not powered, the same water heater undergoes a descaling and cleaning step by carrying out the method of the invention. This can be done when the beverage dispensing machine is turned on, or when it is turned off. Alternatively it can be done at preset time intervals during the operating time.

Figure 4:
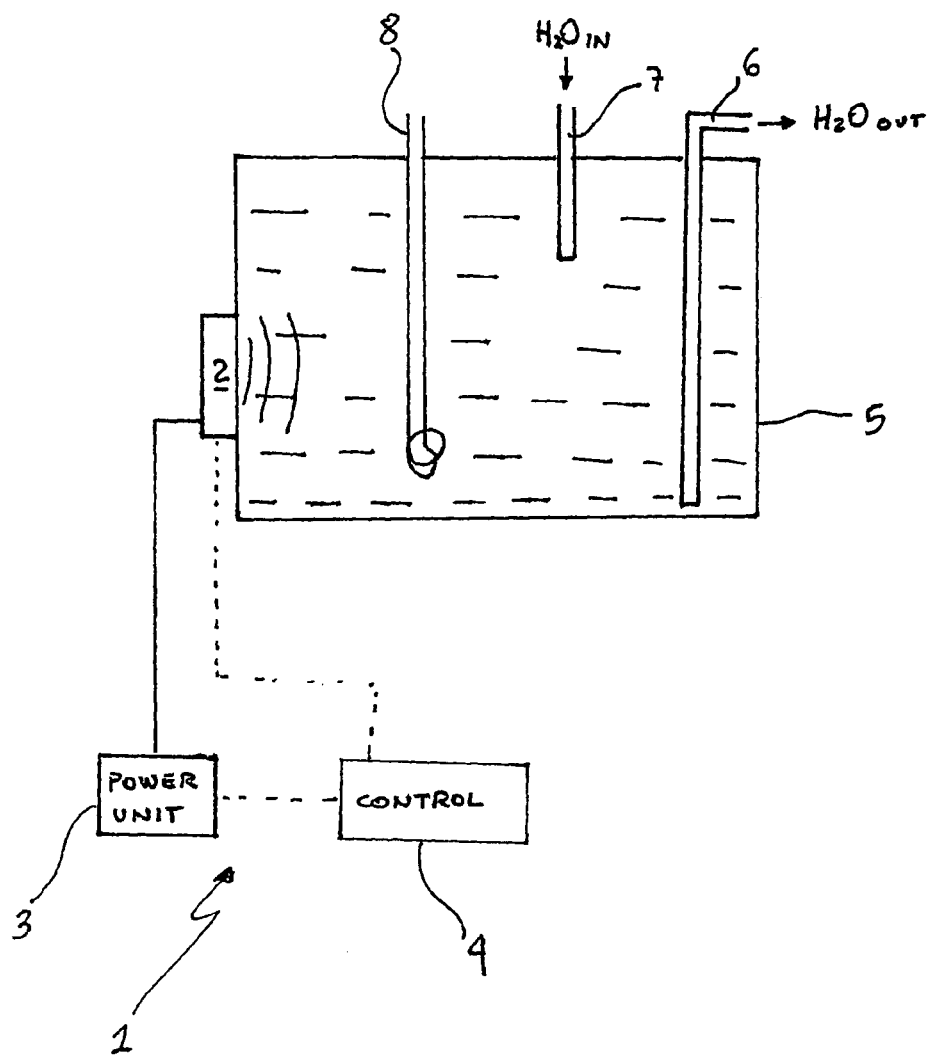
FIG. 4 is a schematic view of an apparatus according to the invention.

An apparatus 1 according to the present invention is schematically shown in FIG. 4, wherein the water heater is known per se. The heater can be a flash-heater, a tube boiler, etc. The apparatus 1 comprises an ultrasonic generator 2 connected to a power unit 3. A control unit 4 manages operation of the ultrasonic generator 2 and the power unit 3. The ultrasonic generator 2 is shown attached to a wall of the water heater 5 of a beverage dispensing machine (not shown) to induce vibrations within such heater 5. The generator 2 can be glued, welded, or jointly fixed to the heater body. Alternatively the ultrasonic generator 2 can be submersed in the water (electrically insulated) contained within the heater 5 to induce vibrations in the water, thereby vibrating also the heater 5.

The water heater is known per se, defining a volume for the water to be heated and to be supplied for preparation of a beverage. For instance water is supplied within the heater through an intake conduit 7 from an external source. Hot water is delivered though the conduit 6 for processing. An heat source 8 is provided, typically an electric heating member.

Alternatively a flash heater can be used. Differently from the aforesaid heater, wherein a volume of water is collected and heated, flash heaters provide heating of the water by induction while flowing through passages, pipes, labyrinths, or similar flow constrictions.

Heating the water promotes deposition of dissolved salts in a layer on the internal surfaces of the heater 5. The layer of limescale which builds up is detrimental to the operation of the heating member 8 and downstream devices of the beverage dispensing machine such as the outlet pipe 6. In particular the deposition of limescale reduces the efficiency of the heating member 8. This problem can be overcome by inducing vibrations through the generator 2, allowing for detachment of the deposits from the heater 5 surfaces.

Preferably the ultrasonic generator is a piezo-electric transducer which can operate at frequencies included in the range from 20 kHz to 100 kHz. A suitable generator is a circular ceramic piezo-electric transducer having a diameter of about 40 mm and height of about 5 mm.

A suitable transducer is available by "PI Ceramic GmbH", coded PRYY-0980, made of a material designated PIC 181 and classified "100" in accordance with the standard EN 50324-1, and "I" in accordance with the standard DOD-STD-1376A. Such transducer has a Curie temperature of about 330° C. Since typical heaters of the beverage dispensing machine run at temperatures below 150° C., the aforesaid transducer can be applied to the heater with no need for thermal insulation. In other words the transducer designated PIC 181 can sustain high temperatures, thereby allowing for any insulating material not to be interposed between the same transducer and the heater, this maximizing transmission of the oscillations.

It has been found that, for effectively removing or reducing limescale deposits within the water heater of a common beverage dispensing machine, a suitable range for the frequency of the induced vibrations is from 25 kHz to 35 kHz and suitable range for the power is from 100 mW to 20 W. Limescale detached from the heater 5 surfaces can be expelled in conventional way, for example by filtering the water supplied through conduit 6.

Preferably the ceramic piezo-electric transducer is powered at 2 (two) Watts, this promoting generation of high energy oscillations within the heater body.

The power unit 3 can be an external power source, for instance providing from 150 Volts to 200 Volts. Alternatively the power unit 3 is the beverage machine power unit, for instance a transformer.

Figure 5:
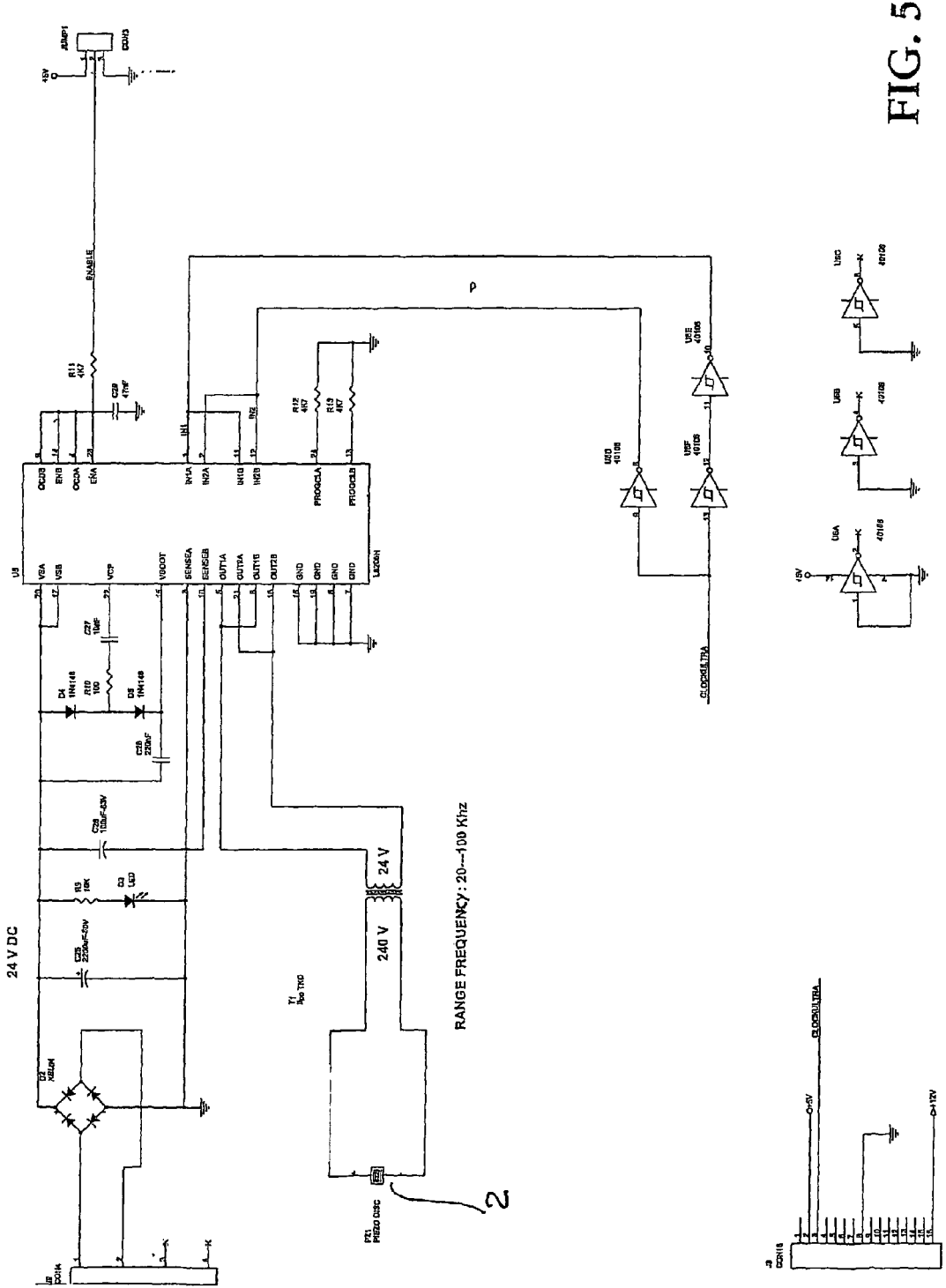
FIG. 5 is an electrical scheme of the apparatus shown in FIG. 4.

The unit 4 controls operation of the piezo-electric transducer 2. A suitable electrical scheme of the control unit 4 is shown in FIG. 5. It is simpler than the circuitry which has to be provided for the apparatus according to EP-A-1378194. No amplifier is provided, neither a second transducer working as a receiver.

The powering unit provides 24 Volts DC. A bridge D2 corrects the alternate voltage at the connector CON4. A transformer unit is provided for switching voltage by the integrated circuit U5 from 24 V to 240 V. Frequency of the alternate voltage is given by the clock signal CLOCKULTRA. Signal ENABLE triggers the activation/shut-down of the control unit 4.

Control unit 4 triggers powering of the transducer 2 according to the method of the present invention, i.e. at given time intervals and frequencies different from the natural frequency of the water heater 5. Powers are preferably greater than the ones known from the prior art. For instance the transducer 2 is powered at five (5) Watts for promoting generation of high energy oscillations.

The natural frequency of the heater 5 can be ascertained by the manufacturer of the beverage dispensing machine. Thus the value of such a frequency can be memorized in a memory means of the control unit 4 to activate the transducer 2 at different frequencies.

The time intervals can be adjusted by the control unit 4 depending on the frequency of the vibrations. When induced frequencies are low, for instance in the range of 20 to 25 kHz, duration of time intervals is at the maximum, for instance in the range from 20 to 30 minutes. When frequencies are higher and more energizing, for instance in the range from 35 to 100 kHz, duration of time intervals is minimized, being for instance in the range from 30 seconds to 10 minutes.

The control unit 4 can collect information about the operation of the beverage dispensing machine to trigger the piezo-electric transducer 2 when the machine is in stand-by or non operative. For instance the control unit 4 can determine the most appropriate cleaning frequency depending on variables taken into account, such as water hardness, dispensing throughputs, user's inputs, etc.

The transducer 2, the control unit 4 and the power unit 3 are economic parts available on the market. Thus the apparatus 1 is easy to assemble and not expensive.

Figure 6:
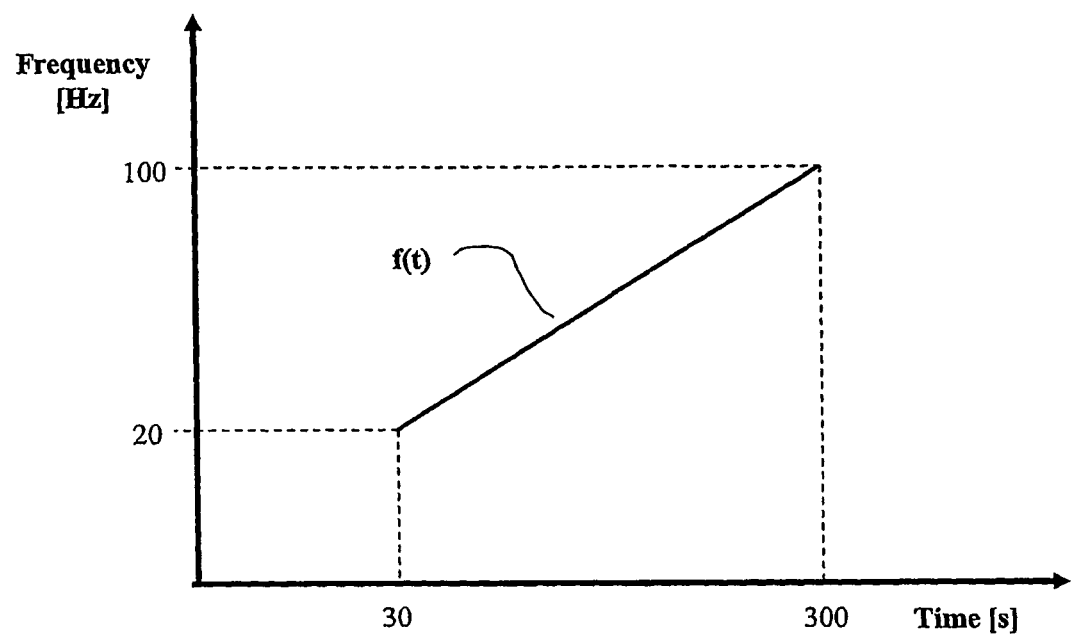
FIG. 6 is a first schematic diagram frequency versus time related to the method according to the invention.

With reference to FIG. 6, it is shown a schematic diagram frequency vs. time relating to possible operating conditions of the apparatus according to the present invention. Provided that powering of the ultrasonic generator is operated discontinuously, as described above, during the operating time lapse the same generator may be powered, as shown in FIG. 6, to scan all the frequencies comprised within the range 20 kHz to 100 kHz. This can be accomplished by the integrated circuit U5 shown in FIG. 5 applying a continuously increasing voltage to the piezo-electric transducer 2. The frequencies of the vibrations induced to the water heater 5 increase correspondingly. As shown in the diagram, the function f(t) of the frequency depending on time is an analog increasing or decreasing ramp. The time interval is 30 seconds up to 300 seconds (five minutes). It is to be understood that if the natural frequency of the water heater 5 is included in the range to be scanned, such a frequency is skipped, i.e. the integrated circuit U5 is controlled to avoid powering the piezo-electric transducer 2 at the natural frequency.

Figure 7:
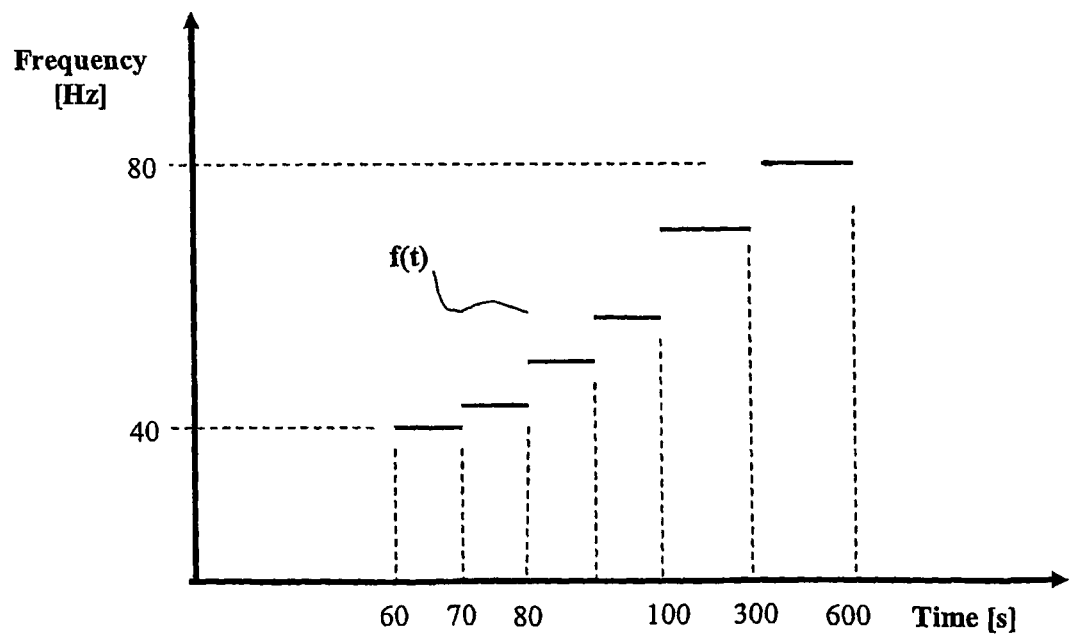
FIG. 7 is a second schematic diagram frequency versus time related to the method according to the invention.

FIG. 7 relates to a different diagram of the frequency versus time, wherein the function f(t) is a train of separate impulses. Function f(t) is not continuous within the indicated time interval of 60-600 seconds, but is a sort of "step function", whereby the piezo-electric transducer 2 is first powered at 40 kHz for a first time interval of 10 seconds, then is powered at 50 kHz for the following 10 seconds, etc., according to the following scheme:

| Frequency [kHz] | time interval [s] |
| --- | --- |
| 40 | 60 up to 70 (duration 10) |
| 45 | 70 up to 80 (duration 10) |
| 55 | 80 up to 90 (duration 10) |
| 60 | 90 up to 100 (duration 10) |
| 75 | 100 up to 300 (duration 200) |
| 80 | 300 up to 600 (duration 300). |

It is to be understood that both functions f(t) shown in FIGS. 6 and 7 may also be decreasing, i.e. starting at the highest frequency and lowering as time lapses.

Scanning of the frequencies allows for effectively detaching limescale deposits within the water heater 5 which may have different thickness or characteristics. In other words, scanning of all frequencies, or several frequencies, within the aforesaid range of 20 kHz up to 100 kHz has found to improve the efficacy of the method according to the present invention, in that each limescale deposit is treated with the most appropriate frequency for promoting its detaching.

Advantageously, the method and the apparatus 1 according to the present invention allow for the effective removal, or reduction, of limescale deposits within water heaters, at the same time minimizing power consumption and noise generation.

After detachment of the limescale deposits from the heater surfaces has been achieved, detached limescale waste is collected or flushes out through the water outlet conduits.

The method and the apparatus according to the present invention can be similarly applied also to clean chambers provided within beverage dispensing machine for mixing ingredients, such as water and milk powder or water and cocoa powder. Oscillations induced by the transducer 2 can be directed to detach residues from the surfaces of the mixing chamber and the mixer.

Mixing chambers are normally made of a plastic material which can absorb vibrations generated by the operation of the transducer 2, thereby reducing efficiency of the apparatus 1. It is preferable to fill the mixing chamber with water and induce oscillation within the filled chamber.

The invention claimed is:

1. A method of detaching limescale deposits from a beverage machine dispensing component of a beverage dispensing machine, the beverage dispensing machine component being selected from the group consisting of a water heater and a mixing chamber, the method comprising the steps of:
   memorizing a natural frequency of the water heater, in a memory means of a control unit;
   determining a frequency in a range of 20 kHz to 100 kHz inclusive;
   inducing ultrasonic vibrations at the determined frequency only if the determined frequency is other than equal to the memorized natural frequency of the water heater;
   selecting an increased or decreased frequency of an ultrasonic generator device if the determined frequency is equal to the memorized natural frequency of the water heater;
   inducing ultrasonic vibrations at the selected frequency to said beverage dispensing machine component or within water contained in the beverage dispensing machine component by powering the ultrasonic generator device for a preset time interval, yet controlling the ultrasonic generator device to avoid the natural frequency of the water heater by skipping the natural frequency of the water heater within the range of 20 kHz to 100 kHz inclusive during the inducing steps, and detaching said limescale deposits in response to the induced vibrations.

2. The method according to claim 1, further comprising the step of:

discarding the detached limescale deposits by gathering the detached limescale deposits in a separate container or flushing out the detached limescale deposits.

3. The method according to claim 1, wherein said ultrasonic generator device comprises at least one piezo-electric transducer.

4. The method according to claim 1, wherein said step of:

inducing ultrasonic vibrations is implemented during a stand-by condition of said beverage dispensing machine.

5. The method of claim 1, further comprising the step of:

detaching alimentary residues within the mixing chamber of the beverage dispensing machine.

6. The method of claim 1, wherein the activating powering of the ultrasonic generator is carried out with water within an enclosure, the vibrations being induced to the enclosure or within the water.

7. The method according to claim 1, wherein the determined frequency is in the range of 20 kHz to 25 kHz inclusive and the duration of the preset time interval is in the range from 20 to 30 minutes.

8. The method according to claim 1, wherein the determined frequency is in the range of 35 kHz to 100 kHz inclusive and the duration of the preset time interval is in the range from 30 seconds to 30 minutes.

9. A method of detaching limescale deposits from a beverage dispensing machine component of a beverage dispensing machine, the beverage dispensing machine component being selected from the group consisting of a water heater and a mixing chamber, the method comprising the steps of:

powering an ultrasonic generator device, memorizing a natural frequency of the water heater, in a memory means of a control unit;

determining a frequency in a range of 20 kHz to 100 kHz inclusive;

selecting an increased or decreased frequency of the ultrasonic generator device if the determined frequency is equal to the memorized natural frequency of the water heater;

inducing ultrasonic vibrations at the determined frequency only if the determined frequency is other than equal to the memorized natural frequency of the water heater;

inducing ultrasonic vibrations at the selected frequency to said beverage dispensing machine component or within water contained in the beverage dispensing machine component by powering the ultrasonic generator device for a preset time interval, yet controlling the ultrasonic generator device to avoid the natural frequency of the water heater by skipping the natural frequency of the water heater within the range of 20 kHz to 100 kHz inclusive during the inducing steps; and detaching said limescale deposits in response to the induced ultrasonic vibrations.

* * * * *